Nov. 15, 1966 J. R. DISON ETAL 3,285,312
LOCKING DEVICE FOR ROTATABLE MEMBERS
Filed May 25, 1964

INVENTORS
James R. Dison, &
BY Frank W. Janneck

A. M. Heiter
ATTORNEY

United States Patent Office 3,285,312
Patented Nov. 15, 1966

3,285,312
LOCKING DEVICE FOR ROTATABLE MEMBERS
James R. Dison, Indianapolis, and Frank W. Janneck, Danville, Ind., assignors to General Motors Corporation, Detroit, Mich., a corporation of Delaware
Filed May 25, 1964, Ser. No. 369,856
4 Claims. (Cl. 151—28)

This invention relates generally to locking devices and more particularly to locking devices for locking a rotatable member in a plurality of angular positions.

Where a rotatable member is desired to be held in a selected angular position, the locking device employed must be adaptable to lock the rotatable member in such selected position. While conventional locking devices have proved generally satisfactory, they often do not meet the required standards of adjustment for the rotatable member. Other problems faced in addition to meeting the required adjustment standards are those of providing a simple locking device which will enable trouble free adjustment and low manufacturing cost.

While locking devices embodying features of this invention have general utility in a large number of fields of application, they are especially advantageously employable to lock a pressure regulating valve in selected pressure setting conditions over a finite pressure range. Briefly stated, the principal of this invention lies in a reversible lock plate which is effective to locate and lock a rotatable member in a plurality of angular settings to permit two degrees of adjustment. The reversible lock plate is illustrated as being employed in a pressure regulating valve having a threaded bias control element which upon rotation moves axially to adjust the bias of a spring controlling pressure regulation.

The reversible lock plate which is securable to the valve body in a selected position by suitable securing means has cutout portions arranged to provide a central strap or tongue which is adapted to engage angularly disposed and equally spaced end slots provided in the bias control element. As initially secured, the tongue, which is disposed at a selected angle from a reference line lying in the plane of the lock plate, cooperates with the end slots to lock the bias control element in any one of the angular settings determined by alignment of the end slots with the tongue. Additional intermediate settings are obtained by inverting the lock plate which locates the reference line relative to the valve body as before and relocates the tongue from its initial angular position through an angle twice the selected angle. The selected angle of the tongue to locate the intermediate settings midway between the settings available prior to inversion and provide equally graduated fine adjustment is determined by the angular spacing of the end slots as will be subsequently explained in the detailed description.

An object of this invention is to provide a new and improved locking device for locking a rotatable member in a plurality of angular positions.

Another object of this invention is to provide a reversibly mountable lock plate to locate and lock by a tongue and slot connection a rotatable member in a plurality of angular settings when initially mounted and in intermediate settings when invertibly mounted.

Another object of this invention is to provide in a locking device a lock plate having a tongue angled in a manner such that when initially installed it determines, upon alignment with cooperating slots in the member to be locked, initial angular settings and upon being inverted is advanced and relocated to determine additional and intermediate angular settings midway between the initial angular settings thereby providing two degrees of adjustment by virtue of inversion.

These and other objects of the invention will be more apparent from the following description and drawing in which.

Figure 1:
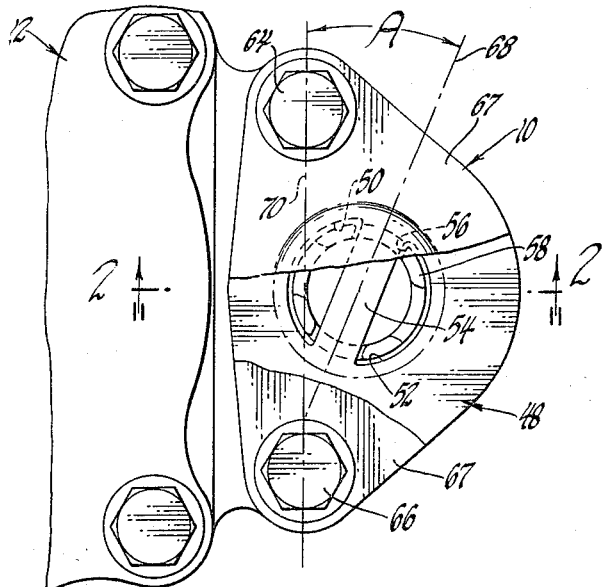
FIGURE 1 is a plan view with parts broken away of a pressure regulating valve employing a locking device embodying features of this invention.

Referring to FIGURE 1, the locking device of this invention is shown employed in a lubrication system pressure regulating valve 10 which is effective to regulate the pressure in a lubrication system servicing the gear box 12.

Figure 2:
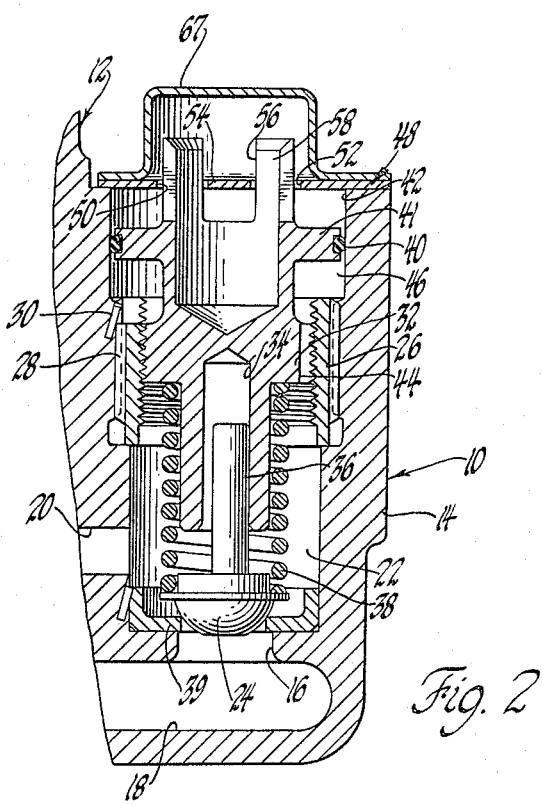
FIGURE 2 is a sectional view taken substantially on the line 2—2 in FIGURE 1.
Figure 4:
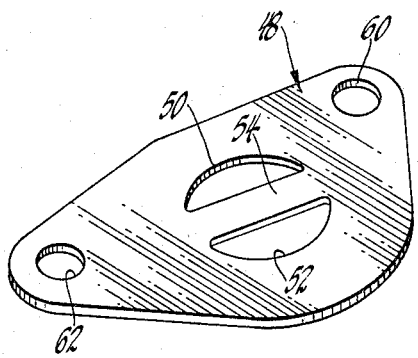
FIGURE 4 is a perspective view of the lock plate.

As best shown in FIGURE 2, a valve body 14 is provided with an inlet port 16 ported to a main lubricant feed passage 18, a discharge port 20 and a valve chamber 22 between the ports in which is received a poppet type valve element 24 for opening and closing the inlet port 16 to chamber 22 and connected discharge port 20.

A retainer collar 26 is rigidly secured in position in an accommodating space in valve body 14 by splines 28 and a stake pin 30 and threadably receives a bias control element 32. The bias control element 32 has a bore 34 which serves as a guide for the stem 36 of valve element 24 and a prestressed coil spring 38 which is arranged between bias control element 32 and valve element 24 urges the latter towards its valve seat 39.

Rotation of bias control element 32 by virtue of its threaded engagement with the fixed retainer collar 26 adjusts axially to determine the spring load afforded by spring 38. Spring load determines the opening and closing of valve element 24 on its seat 39 and thus the pressure maintained in feed passage 18 which is a pressure normally below that available to this passage.

A ring seal 40 mounted in an annular groove provided in a radial extension 41 of bias control element 32 sealingly engages a bore 42 of valve body 14 to prevent leakage from valve chamber 22 in all axial positions of adjustment of the bias control element 32. A relief groove 44 provided in bias control element 32 connects the space 46 below the radial extension 41 and seal 40 to valve chamber 22 to ensure that no high pressure fluid is retained behind the valve element 24 which would adversely effect valve operation.

It will be readily understood from the foregoing that once the rotatable bias control element 32 is adjusted to a desired angular position to provide the desired spring load, it is necessary that such element then be locked in the adjusted position to prevent against accidental rotation which would upset the established pressure setting.

The locking device of this invention permits uniformly graded pressure settings within a finite pressure range by making available a plurality of uniform intervals of angular adjustment of the bias control element 32 relative to the stationary valve body 14. The locking device comprises a lock ring or plate 48 essentially triangular in shape having two centrally located semicircular cutout portions 50 and 52 which provide a central strap or tongue 54 which is adapted to engage a plurality of angularly disposed and equally spaced pairs of diametrically opposite slots 56 provided in the end of an axially extending annular projection 58 of bias control element 32.

As best shown in FIGURE 1, lock plate 48 is adapted to be rigidly secured to the valve body 14 and for that purpose has a pair of apertures 60 and 62 for accommodating screws 64 and 66 respectively, the valve body 14 being tapped to accommodate such screws. Screws 64 and 66 also serve to secure a cap 67 to the valve body 14 to protect the valve assembly from foreign material. The center line 68 of tongue 54 is located at an angle A measuring clockwise from a reference line 70 which passes through the centers of apertures 60 and 62 which provide the securing points for the lock plate. In the embodiment shown, there are 90° intervals between each adjacent slot 56 and the angle A is determined to be 22½° which is ascertained by dividing the angular interval between adjacent slots by the numeral four (4), the basis for such calculation becoming more apparent from the description which follows. The provision of reversibility of the lock plate 48, as will be shown, coupled with the two pairs of aligned slots 56 of bias control element 32 provides two degrees of adjustment and permits element 32 to be locked at every ⅛ turn from an initial position or, namely 45° intervals of adjustment between each locking position.

Figure 3:
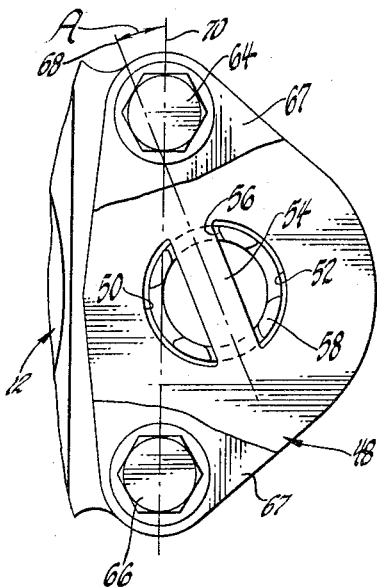
FIGURE 3 is a view like FIGURE 1 showing the lock plate inverted.

In the lock plate installation shown in FIGURE 1, the bias control element 32 may be locked at each quarter turn from an initial position thus enabling locking positions spaced 90° apart. If the tongue 54 were rotated counterclockwise about an axis passing through its center point and from its position shown in FIGURE 1 through an angle of 45°, the 90° intervals of adjustment already available by virtue of this lock plate installation would be halved resulting in an available 45° interval of adjustment and a finer degree of adjustment. This is accomplished by the provision of the angular disposition of tongue 54 which is set at 22½° since by merely removing the lock plate 48 from its installed position shown in FIGURE 1 and inverting the lock plate, there is permitted by reason of the tongue being located at a fixed angle to its axis of rotation the relocation of tongue 54 as shown in FIGURE 3 resulting in the tongue 54 being angled at 22½° measuring counterclockwise from reference line 70. Thus, it will be observed that tongue 54 has been rotated 45° from its initial installed position shown in FIGURE 1 and about its center axis to permit locking at the midpoints between the 90° intervals so that locking of the bias control element at every ⅛ turn from its initial position is available for fine adjustment.

If it is assumed that valve 10 is designed to be adjustable over a range of 15.0 p.s.i. and with a 6.0 p.s.i. adjustment per complete turn of bias control elment 32, the locking device of this invention permits adjustment to be made and the position secured at every ⅛ turn or within a maximum tolerance of 0.75 p.s.i.

It will be readily understood to those skilled in the art that the total number of available adjustment positions will be determined by the number of slots with the angular disposition of the lock plate tongue being determined by dividing the angular spacing between slots by the numeral four (4) to permit inverting of the lock plate for the two degrees of adjustment. While the lock plate has been depicted as being secured to a stationary member and the slots being diametrically opposite and provided in the rotatable member, it will be further readily understood by those skilled in the art that the prime objective is the prevention of relative motion in selected angular setting by the use of a reversible lock plate permitting two degrees of adjustment and that the lock plate can be adapted to cooperate with an odd number of equally spaced slots and can also be secured to the rotatable member with the tongue being adapted to engage slots provided in the stationary member.

The above-preferred embodiment is illustrative of the invention which may be modified within the scope of the appended claims.

We claim:

1. In a lock device, a rotatable member having an even number of angularly disposed and equally spaced slots, a stationary member, a lock plate, said stationary member and said lock plate having a pair of corresponding locating means, said lock plate having a tongue located at a selected angle greater than zero measured from a reference line which passes through the centers of said locating means on said lock plate securing means cooperating with said locking means to detachably secure said lock plate to said stationary member in a first position and in a second position inverted from said first position, said tongue cooperating with said slots to locate and lock said rotatable member in different selected angular settings as determined by selected alignment of said slots with said tongue when said lock plate is in either of said positions and said selected angle being determined by dividing the angular spacing between adjacent slots by the numeral four (4).

2. The lock device set forth in claim 1 and said lock plate having adjacent cutout portions defining said tongue and said slots being provided in an end projection of said rotatable member whose portions between slots are received by said cutout portions when said lock plate is secured for locking.

3. In a lock device, a rotatable member having a plurality of angularly disposed and equally spaced pairs of diametrically opposite slots, a stationary member, a lock plate having a tongue, securing means to detachably secure said lock plate to said stationary member in a first position and in a second position inverted 180° from said first position, said tongue being located at a fixed angle to an axis about which the tongue rotates when the position of said lock plate is changed so that said tongue cooperates with said pairs of slots to located and lock said rotatable member in different selected angular settings as determined by selected alignment of said pairs of slots with said tongue when said lock plate is in either of said positions, said fixed angle being determined by dividing the angular spacing between adjacent slots by the numeral four (4).

4. In a lock device, a first member, a second member angularly movable relative to said first member, a lock member securable to one of said first and second members and having first lock means, the other of said first and second members having a plurality of angularly disposed evenly spaced pairs of aligned second lock means, securing means to secure said lock member to said one member in a first secured position and also to secure said lock member to said one member in a second secured position inverted 180° from said first secured position, said first lock means when said lock member is in said first secured position being disposed in an initial locking position and at a fixed angle to an axis about which said first lock means rotates when the position of said lock member is changed so that said first lock means is rotated to another locking position located from said first initial locking position at an angle twice said fixed angle when said lock member is changed from said first secured position to said second secured position, said fixed angle being determined by dividing the angular spacing between adjacent said second lock means by the numeral four (4), said first lock means in said initial locking position cooperating with said pairs of second lock means to locate and lock said other member in a first set of angular settings as determined by selected engagement of said first lock means with said pairs of second lock means, and said first lock means when in said another locking position cooperating with said pairs of second lock means to locate and lock said another member in a second set of angular settings intermediate said first set of angular settings as determined by said fixed angle and selected engagement of said first lock means with said pairs of second lock means.

References Cited by the Examiner
UNITED STATES PATENTS

| | | | |
|---|---|---|---|
| 1,420,737 | 6/1922 | Palmgren | 151—28 |
| 1,431,459 | 10/1922 | Hardie | 151—28 |

FOREIGN PATENTS 127,598   9/1928   Switzerland.

CARL W. TOMLIN, *Primary Examiner.*

R. S. BRITTS, *Assistant Examiner.*

UNITED STATES PATENT OFFICE
CERTIFICATE OF CORRECTION

Patent No. 3,285,312                                November 15, 1966

James R. Dison et al.

It is hereby certified that error appears in the above numbered patent requiring correction and that the said Letters Patent should read as corrected below.

Column 3, line 44, for "elment" read -- element --; column 4, line 2, for "plate" read -- plate, --; line 3, for "locking" read -- locating --; line 28, for "located" read -- locate --.

Signed and sealed this 12th day of September 1967.

(SEAL)
Attest:

ERNEST W. SWIDER                                EDWARD J. BRENNER
Attesting Officer                                   Commissioner of Patents